F. I. & B. P. REMY & A. BERGER.
CLUTCH DRIVE MECHANISM.
APPLICATION FILED DEC. 13, 1912.
1,203,408.
Patented Oct. 31, 1916.
2 SHEETS—SHEET 1.
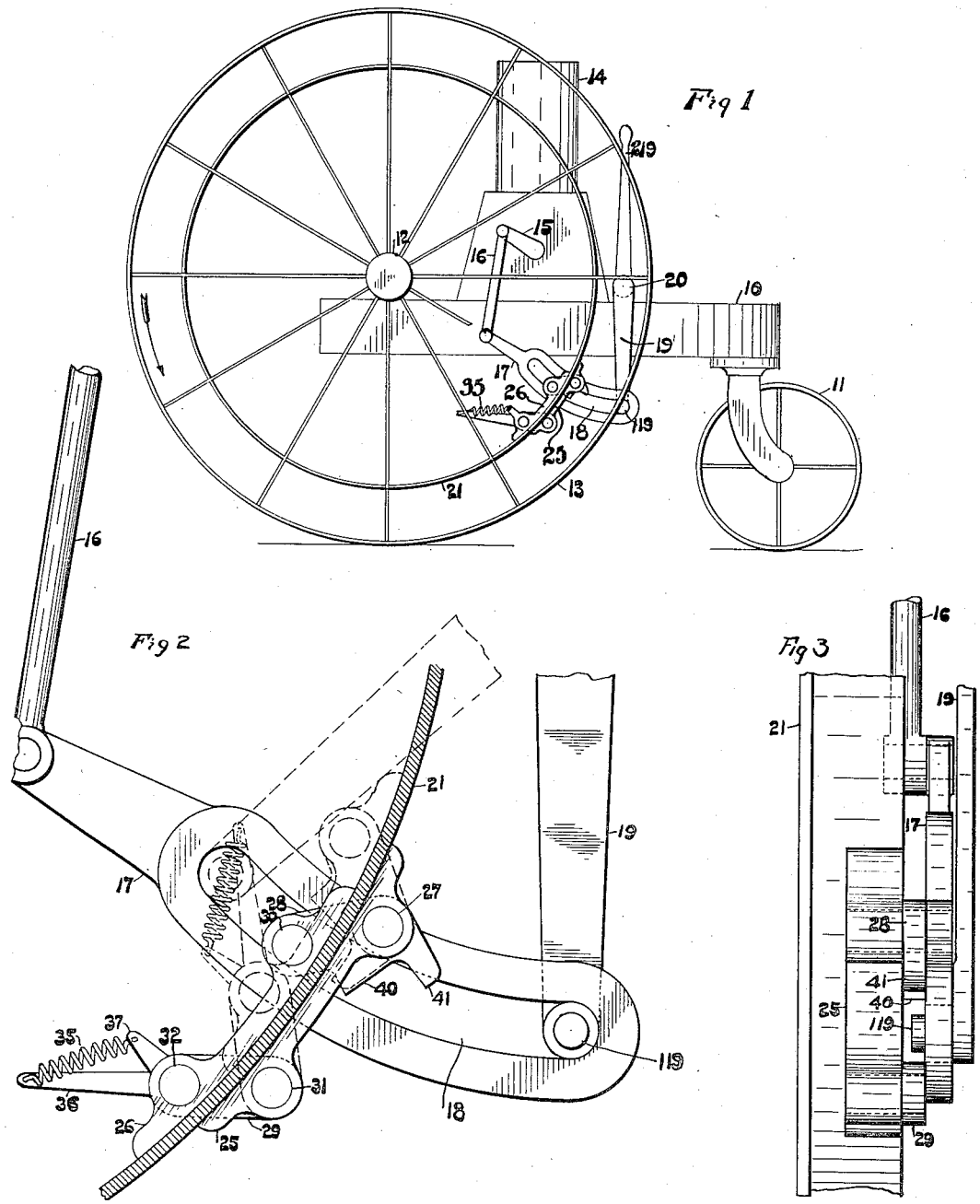
WITNESSES:
A H Edgerton
Orpha M. McLaughlin
INVENTORS.
BENJAMIN P. REMY,
FRANK I. REMY AND
ARTHUR BERGER
BY
T H Lockwood
ATTORNEY.

F. I. & B. P. REMY & A. BERGER.
CLUTCH DRIVE MECHANISM.
APPLICATION FILED DEC. 13, 1912.
1,203,408.
Patented Oct. 31, 1916.
2 SHEETS—SHEET 2.
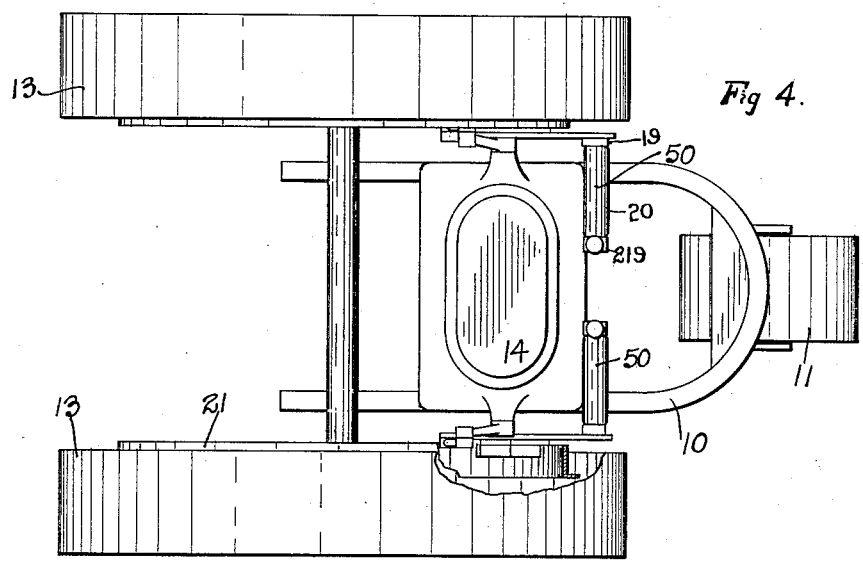
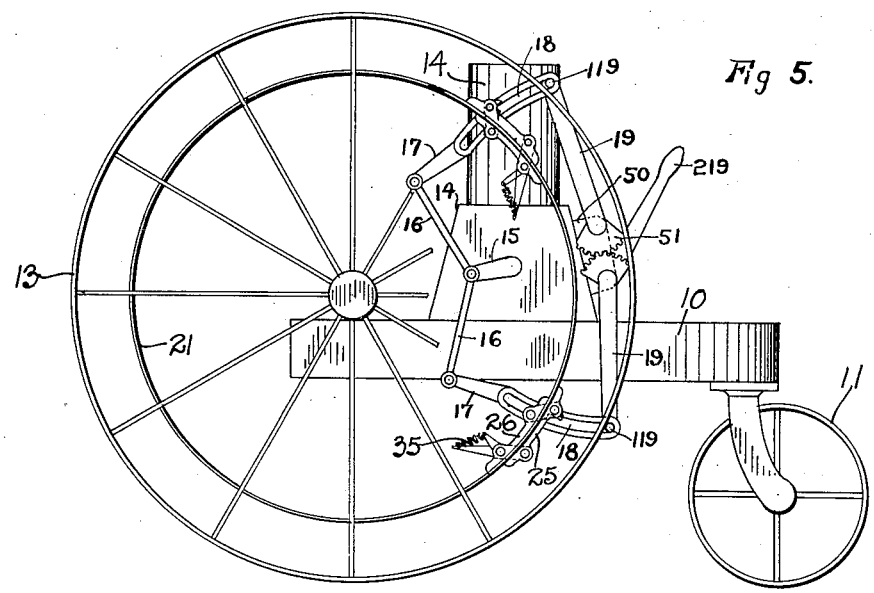
WITNESSES:
A H Edgerton
Orpha M. McLaughlin
INVENTORS.
BENJAMIN P. REMY,
FRANK I. REMY AND
ARTHUR BERGER
BY
V. H. Lockwood
ATTORNEY.

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

CLUTCH DRIVE MECHANISM.

1,203,408.            Specification of Letters Patent.      Patented Oct. 31, 1916.

Application filed December 13, 1912. Serial No. 736,523.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Clutch Drive Mechanism; and we do hereby declare that the following is a full, clear, and exact description thereof, reference being had to the accompanying drawings, in which like letters refer to like parts.

The object of this invention is to provide an improved means for transmitting power to the drive wheels of vehicles whereby the same may be driven and the speed thereof changed and the relative speeds of the two oppositely located drive wheels also changed for steering the machine through the drive wheels.

The invention has been made with special reference to use in connection with tractor engines and the like.

The chief feature of the invention consists in providing a band or ring on each drive wheel and providing a clamping clutch to operate in connection therewith, which clutch is carried by a lever to one end of which power is transmitted from the engine. There is also provided herein variable controllable means for altering the fulcrum of said levers and independently of each other, whereby the speed of the two drive wheels may be simultaneously and equally changed or their relative speeds may be altered for turning and steering purposes.

The nature of the invention will be understood from the accompanying drawings and the following description and claims.

In the drawings, Figure 1 is a side elevation of a tractor equipped with said invention. Fig. 2 is a vertical section through a portion of the band on the drive wheel and showing the clamping clutch and lever mechanism on an enlarged scale, parts being broken away and the reversing position being shown by dotted lines. Fig. 3 is an elevation of what appears in Fig. 2, viewed from the position at the right-hand thereof. Fig. 4 is a plan view of the tractor shown in Fig. 1. Fig. 5 is a side elevation of a modified form of driving wheel and driven mechanism, a plurality of clamping clutches being shown.

In the drawings 10 represents the frame of a vehicle, one end of which is supported by a swivel wheel 11 and the other end by an axle 12 carried by two drive wheels 13, one on each side of the frame. Upon the frame 10 there is located an engine 14 or any suitable power mechanism, the crank shaft 15 of which is connected by a connecting bar 16 with the inner end of a lever 17 which is fulcrumed at 18 on the lower end of a controlling hand lever 19. The lever 19 which has two vertical ends and an intermediate horizontal portion, is fulcrumed at 20 about midway of the frame 10. The lever 17 is slotted longitudinally throughout the most of its length and concentrically with the fulcrum 20 and a pin 119 on the hand lever 19 extends through said slot, and said lever 17 carries clamping clutch mechanism, hereafter explained, adapted to slide on and clutch an annular band or ring 21 secured to the inside of the drive wheel.

The parts just described are duplicated on both sides of the device, the hand levers 19 being independently operable and by operating the same, the fulcrum 18 for the clutch carrying lever 17 may be moved to any position in the slot thereof and thus vary the speed of the wheel and the speed of one wheel may be varied differently from that of the other and thus the device be turned or steered through the drive wheels.

The clamping clutch construction is as follows: There are two similarly formed clutches 25 and 26, one on the inside and the other on the outside of the band 21, as shown in Fig. 2. The outside clutch 25 is carried by the lever 17 through a fulcrum pin 27. The inside clutch 26 is linked to the outside clutch by two parallel links 28 and 29, the link 28 extending from the pin 27 to a pin 30 in the clutch 26 and the link 29 extending from a pin 31 on the clutch 25 to a pin 32 on the clutch 26. It is thus seen that when the inner end of the lever 17 is elevated by the crank shaft 15 and connecting bar 16, and the outer end of said lever being fulcrumed and supported on the lower end of the controlling lever 19, the clutches will clamp the band 21 and drive the wheel forward in the direction of the arrow indicated in Fig. 1. This clamping results because of the drag of the inner clutch 26 and and the tightening or clamping effect, therefore, of the two links 28 and 29. It is obvious also that on the down stroke of the connecting bar 16, said clutches will disengage the wheel band 21 and as soon as the up stroke begins, will again clutch the same and drive it.

In order to hold the two clutches normally in frictional engagement with the wheel band 21, a spring 35 is provided which connects the outer end of an arm 36 secured to the link 29 and an arm 37 which is secured to the inner clutch 26. This causes the clutches to clamp very quickly on the wheel band as soon as the actuating movement of the lever 17 begins.

Obviously the speed of the drive wheel will be greater when the fulcrum 119 is at the outer end of the slot in the lever 17 because greater throw is given then to said lever and consequently greater movement of the clamping clutches at each stroke thereof. If the upper end of the lever 19 be drawn to the right somewhat so as to move the fulcrum 119 in to a point about midway between the outer end of the lever 17 and the wheel band 21, the stroke and speed would be correspondingly reduced. If the fulcrum 119 be moved in beside the wheel band 21, no speed at all would be given to the drive wheels. Thus with a lever 19 for each of the drive wheels of the vehicle, it is seen that the operator can control his speed as he desires. If he moves the two levers 19 equally, he will change his speed and go straight ahead. If, however, he varies the movement of his two levers 19, he will turn or steer his vehicle to the extent of the variation in the movement of said levers and he will vary the movement of said levers according to the sharpness of the turn he is trying to make. To reverse, he actuates the lever 19 until he moves the fulcrum 119 in the slot or lever 17 inward beyond the wheel band 21, for example as shown in dotted lines in Fig. 2. As this is being done, the fulcrum 119 will strike a trip or projection 40 integral with the link 28 and projecting into the slot and path of the lever 17 and in an inclined position, as shown in Fig. 2. The effect of that will be to turn the link 28 on its fulcrum 27 up to the dotted line position shown in Fig. 2, and that will move the inner clutch 26 upward relative to the outer clutch 25, to the dotted line position, and cause a corresponding turning of the lower link 29 and it will throw the arms 36 and 37 into the dotted line position where they will be opposite to each other as compared with their previous position and the spring 35 will still tend to cause the two clutches to engage the wheel band 21 during the actuating movement of the lever 17. Such actuating movement of the lever 17 with the fulcrum 119 at the inner end of its slot, occurs during the downward throw or movement of the inner end of said lever 17 and, therefore, the drive wheel will be propelled backward.

After the machine has been reversed in the manner above described and the lever 19 is reversed again and the fulcrum pin 119 moved outward along the slot in the lever 17, it will strike another trip 41 integral with the link 28 and when the link is in its upper dotted line position, the trip 41 extends across the path of the pin 119, as indicated by dotted lines in Fig. 2, so that the outward movement of the pin 119 will strike the trip 41 and throw the inner clutch back to its full line position shown in Fig. 2. For this purpose the pin 119 projects inward beyond the lever 17, as shown in Fig. 3.

In Fig. 5 there is a modified form shown differing from the previous figures only in having a plurality of levers 17 and clutch mechanisms mounted thereon. One of these levers and clutch mechanisms is mounted below and the other above the crank 15 on the engine shaft and instead of the lever 19 being formed as in the preceding figures, a lever construction is provided for simultaneously shifting the fulcrums 119 for both levers 17 in the same direction. To that end the fulcrums 119 are placed on the levers 19, the horizontal portions of which are shaft-like and have bearing in a bracket 50 on the engine and have segmental gears 51 secured to them which intermesh and one of them has a handle portion 219, whereby both levers 19 are simultaneously operated.

We claim as our invention:

1. A frame, a swivel wheel for supporting one end of said frame, a pair of driving wheels mounted on opposite sides thereof and each having an inwardly extending annular band, a substantially radially extending lever beside each wheel band, a clutch mechanism carried by each lever for clamping said wheel band, means for actuating the levers, and means for changing the fulcrums of the levers whereby the speed of said drive wheels will be changed.

2. A frame, a swivel wheel for supporting one end of said frame, a pair of driving wheels mounted on opposite sides thereof and each having an inwardly extending annular band, a substantially radially extending lever beside each wheel band, a clutch mechanism carried by each lever for clamping said wheel band, a single means for oscillatably actuating the ends of said lever, and means for changing the fulcrums of the levers whereby the speed of said drive wheels will be changed.

3. A frame, a swivel wheel for supporting one end of said frame, a pair of driving wheels mounted on opposite sides thereof having inwardly extending annular bands, a controlling lever fulcrumed at each side of said frame, a wheel actuating lever adjustably fulcrumed on each of said controlling levers and extending substantially radially of each drive wheel, a clutch mechanism carried by each actuating lever for clamping the band on each drive wheel, a power crank shaft carried by the frame, and connecting bars from each end of said crank shaft to the inner ends of each actuating lever.

4. A frame, a swivel wheel for supporting one end of said frame, a pair of driving wheels mounted on opposite sides thereof having inwardly extending annular bands, a controlling lever at each side of the frame provided with a fulcrum pin, an actuating lever having a slot concentric with the fulcrum of the controlling lever and in which slot said pin extends and is movable, a clutch mechanism carried by each actuating lever for clamping the band on each drive wheel, a power crank shaft carried by the frame, and connecting bars from each end of said crank shaft to the inner ends of each actuating lever.

5. A frame, a swivel wheel for supporting one end of said frame, a pair of driving wheels mounted on opposite sides thereof having inwardly extending annular bands, a controlling lever at each side of the frame provided with a fulcrum pin, an actuating lever having a slot concentric with the fulcrum of the controlling lever and in which slot said pin extends and is movable, a clutch mechanism secured to said slotted actuating lever between the ends of said slot, a power crank shaft carried by the frame, and connecting bars from each end of said crank shaft to the inner ends of each actuating lever, whereby the fulcrum of said actuating lever may be changed from one side of the wheel band to the other side thereof.

6. A frame, a swivel wheel for supporting one end of said frame, a pair of driving wheels mounted on opposite sides thereof having inwardly extending annular bands, a controlling lever fulcrumed at each side of said frame, a wheel actuating lever adjustably fulcrumed on each of said controlling levers and extending substantially radially of each drive wheel, a clutch pivoted to said actuating lever in position to engage one side of said drive wheel, another clutch adapted to engage the other side of the wheel band, and parallel links pivotally connecting said two clutches so that when moved in one direction they will clamp the wheel band and when moved in the other direction will not clamp the same, a power crank shaft carried by the frame, and connecting bars from each end of the crank shaft to the inner ends of each actuating lever.

7. A frame, a swivel wheel for supporting one end of said frame, a pair of driving wheels mounted on opposite sides thereof having inwardly extending annular bands, a controlling lever fulcrumed at each side of said frame, a wheel actuating lever adjustably fulcrumed on each of said controlling levers and extending substantially radially of each drive wheel, a clutch pivoted to said actuating lever in position to engage one side of said drive wheel, another clutch adapted to engage the other side of the wheel band, parallel links pivotally connecting said two clutches so that when moved in one direction they will clamp the wheel band and when moved in the other direction will not clamp the same, spring actuated means for causing said clutch members to clamp said wheel band, a power crank shaft carried by the frame, and connecting bars from each end of the crank shaft to the inner ends of each actuating lever.

8. A frame, a swivel wheel for supporting one end of said frame, a pair of driving wheels mounted on opposite sides thereof having inwardly extending annular bands, a controlling lever fulcrumed at each side of said frame, a wheel actuating lever adjustably fulcrumed on each of said controlling levers and extending substantially radially of each drive wheel, a clutch pivoted to said actuating lever in position to engage one side of said drive wheel, another clutch adapted to engage the other side of said drive wheel, parallel links pivotally connecting said two clutches so that when moved in one direction they will clamp the wheel band and when moved in the other direction will not clamp the same, an arm extending from one of said links, another arm extending from the last-mentioned clutch, a spring connecting the ends of said arms, a power crank shaft carried by the frame, and connecting bars from each end of the crank shaft to the inner ends of each actuating lever.

9. A frame, a swivel wheel for supporting one end of said frame, a pair of driving wheels mounted on opposite sides thereof having inwardly extending annular bands, a controlling lever at each side of the frame provided with a fulcrum pin, an actuating lever having a slot concentric with the fulcrum of the controlling lever and in which slot said pin extends and is movable, a clutch pivotally mounted on said actuating arm in position to engage the wheel band, another clutch in position to engage the opposite side of the wheel band, parallel links pivotally connecting said clutches, trips extending from one of said links into the path of the fulcrum pin extending through the slot in the actuating lever so that when said fulcrum pin is moved in said slot from one side to the other side of the wheel band it will reverse the relative positions of one of said clutches so as to change the direction of actuation of the wheel, a power crank shaft carried by the frame, and a connecting bar from each end of said crank shaft to the inner end of each actuating lever, whereby the fulcrum of said actuating lever may be changed from one side of the wheel band to the other side thereof.

10. A frame, a swivel wheel for supporting one end of said frame, a pair of driving wheels mounted on opposite sides thereof having inwardly extending annular bands, a controlling lever at each side of the frame provided with a fulcrum pin, an actuating lever having a slot concentric with the fulcrum of the controlling lever and in which slot said pin extends and is movable, a clutch pivotally mounted on said actuating arm in position to engage the wheel band, another clutch in position to engage the opposite side of the wheel band, spring held means for holding the clutch members in their altered positions against the wheel band, parallel links pivotally connecting said clutches, trips extending from one of said links into the path of the fulcrum pin extending through the slot in the actuating lever so that when said fulcrum pin is moved in said slot from one side to the other side of the wheel band it will reverse the relative positions of one of said clutches so as to change the direction of actuation of the wheel, a power crank shaft carried by the frame, and a connecting bar from each end of said crank shaft to the inner end of each actuating lever.

11. A frame, a swivel wheel for supporting one end of said frame, a pair of driving wheels mounted on opposite sides thereof and each having an inwardly extending annular band, a plurality of substantially radially extending levers beside each wheel band and longitudinally slotted, a driving crank shaft located between said levers, connecting rods from said crank shaft to said levers, a clutch mechanism carried by each lever for clamping said wheel band, a pair of hand operated levers fulcrumed between said clutch carrying levers and provided with fulcrums movable in the slots in said levers, a pair of segmental gears secured to said last-mentioned levers and intermeshing, and a handle for actuating one of said levers whereby they will simultaneously shift both of said fulcrums inwardly or outwardly to the same extent.

In witness whereof, we have hereunto affixed our signatures in the presence of the witnesses herein named.

FRANK I. REMY.
BENJAMIN P. REMY.
ARTHUR BERGER.

Witnesses:
H. P. POLAND,
RUTH I. MILLER.